N. L., R. P. & J. F. BAKER.
RESILIENT TIRE.
APPLICATION FILED NOV. 6, 1912.
1,088,053.  Patented Feb. 24, 1914.
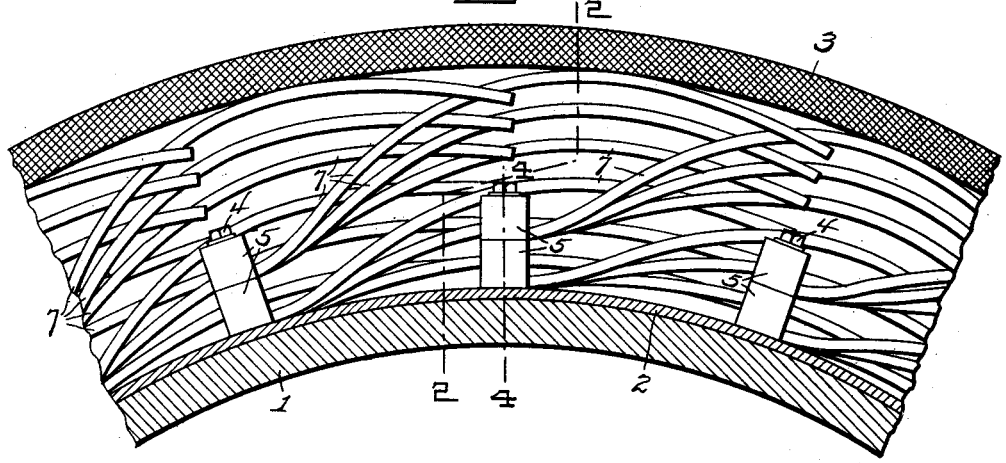
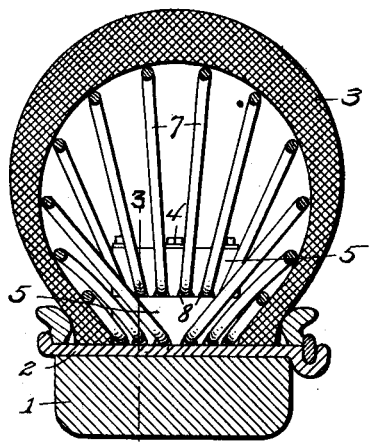
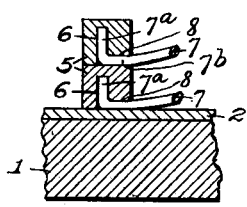
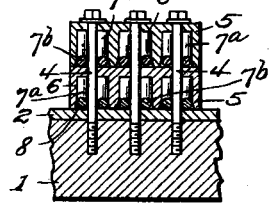
WITNESSES:
F. E. Arthur
L. E. Rose
INVENTORS—
Norbert L. Baker.
Raymond P. Baker.
BY John F. Baker.
N. E. Dunlap
ATTORNEY.

UNITED STATES PATENT OFFICE.

NORBERT L. BAKER, RAYMOND P. BAKER, AND JOHN F. BAKER, OF ELM GROVE, WEST VIRGINIA, ASSIGNORS OF ONE-FOURTH TO P. F. FORRESTER, OF WHEELING, WEST VIRGINIA.

RESILIENT TIRE.

1,088,053. Specification of Letters Patent. Patented Feb. 24, 1914.

Application filed November 6, 1912. Serial No. 729,738.

*To all whom it may concern:*

Be it known that we, NORBERT L. BAKER, RAYMOND P. BAKER, and JOHN F. BAKER, citizens of the United States of America, and residents of Elm Grove, county of Ohio, and State of West Virginia, have invented certain new and useful Improvements in Resilient Tires, of which the following is a specification.

This invention relates to improvements in resilient tires, and more particularly to means whereby hollow tire casings are yieldingly maintained in expanded condition.

The primary object of the invention is to provide readily yielding means applicable to the rims of vehicle wheels and tires of an ordinary type, whereby the tires are yieldingly sustained in their natural rounded form.

A further object is to provide a simple, durable and comparatively inexpensive device adapted for use in connection with tire casings of an ordinary pneumatic type whereby said casings are yieldingly expanded, the use of air for maintaining the casings in inflated condition being dispensed with.

The invention consists in the features of construction, arrangement of parts and combinations of elements which will hereinafter be fully described, reference being had to the accompanying drawings, forming a part of this specification, in which—

Figure 1 is a longitudinal section of a wheel rim and tire casing, showing the invention applied thereto; Fig. 2 is a cross section on the line 2—2, Fig. 1; Fig. 3 is a vertical section on the line 3—3, Fig. 2; and Fig. 4 is a section on the line 4—4, Fig. 1.

Referring to said drawings, in which like designating characters distinguish like parts throughout the several views 1 indicates the usual wooden felly and 2 the metal rim of a vehicle wheel, said rim having mounted thereon in a suitable manner a tire casing 3 of a common type. Rigidly secured, as by means of bolts 4, on the rim 2 at suitable spaced intervals so as to occupy positions between the parallel tire-rims is a plurality of spring mountings, each comprising a block 5, or a plurality of such blocks mounted in superposed relation, as shown in the drawings.

Each block 5 has formed therein on its under side a plurality of vertical sockets 6 adapted for receiving therein the upright terminals 7$^a$ of a plurality of spring fingers 7, preferably formed of steel wire, the bodies of which are arcuately curved and extend rearwardly from said block in a substantially longitudinal direction with respect to the rim 2. Grooves 8 provided in the under side of the block intersect the sockets 6, affording seats in which the horizontal portion 7$^b$ of the fingers 7 rest, as is most clearly shown in Fig. 3. From said block the fingers diverge so as to present their bowed portions in supporting relation to the inner surface of the casing 3 at spaced distances apart for normally maintaining the rounded expanded cross sectional contour of the latter. When a plurality of blocks are located in superposed relation, as shown, the fingers mounted in the uppermost block are so directed as to engage and brace the tread portion of the casing, and those mounted in the lower block or blocks are so directed as to engage and brace the side walls of said casing, as is most clearly shown in Fig. 2.

The free ends of the fingers have a downward inclination so that by no chance may they come into engagement with the casing injury to the latter and distortion of the fingers being thus effectually guarded against.

The blocks are disposed along the rim 3 at suitably spaced intervals so that the fingers carried by one block or set of blocks will be directed over, or extend laterally of, the next block or set of blocks in the rear thereof, as shown in Fig. 1, thus affording a substantially continuous readily yieldable support for the casing.

Having thus described our invention, what we claim as new, and desire to secure by Letters Patent, is—

1. The combination with a wheel rim and a hollow tire casing mounted thereon, of a plurality of blocks rigidly mounted on said rim and located at spaced distances apart, and a plurality of arcuately curved spring wire fingers mounted at one end in each block, the bowed portions of said fingers being disposed in supporting relation to the inner surface of the casing walls, and the free ends of the fingers being disposed and freely movable between the fingers of the next block in the rear.

2. The combination with a wheel rim and a hollow tire casing mounted thereon, of a plurality of blocks rigidly mounted on said rim and located at spaced distances apart, each of said blocks having a plurality of vertical sockets therein with grooves intersecting said sockets, and a plurality of arcuately curved divergently disposed spring wire fingers having upright terminals mounted in the sockets of each block, said fingers being disposed to engage the inner surface of said casing at suitably separated points for normally maintaining the rounded cross sectional contour thereof, the free ends of the fingers of each block being projected over and beyond the next block in the rear thereof and operating between the fingers of the last mentioned block.

3. The combination with a wheel rim and a hollow tire casing mounted thereon, of a plurality of blocks rigidly mounted on said rim and located at spaced distances apart, and a plurality of arcuately curved divergently disposed spring wire fingers mounted at one end in each block, said fingers being disposed to present the bowed portions thereof to the casing walls at suitably separated points for normally maintaining the rounded cross sectional contour of said casing and having their free ends projected over and beyond the next block in the rear thereof and freely movable between the fingers of the last mentioned block.

4. The combination with a wheel rim and a hollow tire casing mounted thereon, of a plurality of sets of blocks rigidly mounted on said rim at suitably spaced intervals, the blocks of each set being mounted in superposed relation, and a plurality of spring wire fingers rigidly mounted at one end in said blocks, said fingers being divergently disposed to present bowed portions thereof in supporting relation to the casing walls at suitably separated points for yieldably maintaining the rounded cross sectional contour of said casing, the free ends of the fingers of each set being disposed and freely movable between the fingers of the next set in the rear thereof.

In testimony whereof we affix our signatures in presence of two witnesses.

NORBERT L. BAKER.
RAYMOND P. BAKER.
JOHN F. BAKER.

Witnesses:
H. E. Dunlap,
L. D. Morris.

---

Copies of this patent may be obtained for five cents each, by addressing the "Commissioner of Patents, Washington, D. C."